(12) United States Patent
Orgeron

(10) Patent No.: US 8,419,335 B1
(45) Date of Patent: Apr. 16, 2013

(54) PIPE HANDLING APPARATUS WITH STAB FRAME STIFFENING

(75) Inventor: Keith J. Orgeron, Houston, TX (US)

(73) Assignee: T&T Engineering Services, Inc., Tomball, TX (US)

( * ) Notice: Subject to any disclaimer, the term of this patent is extended or adjusted under 35 U.S.C. 154(b) by 263 days.

(21) Appl. No.: 12/371,593

(22) Filed: Feb. 14, 2009

Related U.S. Application Data

(63) Continuation-in-part of application No. 12/013,979, filed on Jan. 14, 2008, now Pat. No. 7,726,929, which is a continuation-in-part of application No. 11/923,451, filed on Oct. 24, 2007, now Pat. No. 7,918,636.

(51) Int. Cl.
*E21B 19/00* (2006.01)
*B66C 23/06* (2006.01)

(52) U.S. Cl.
USPC ............................ 414/22.55; 212/255; 901/48

(58) Field of Classification Search ............... 166/77.52, 166/77.53; 175/85; 294/81.61; 414/22.51–22.58, 414/601–602, 673, 719, 733, 917, 22.62, 414/23, 546, 680, 729, 738, 740, 742, 746.8, 414/783, 701, 736, 776; 52/119–120; 74/103, 74/110, 490.01, 490.05, 63, 66, 68; 901/14–16, 901/21–22, 30, 48; 212/280; 248/280.11
See application file for complete search history.

(56) References Cited

U.S. PATENT DOCUMENTS

| | | | |
|---|---|---|---|
| 62,404 A | 2/1867 | Gile et al. | |
| 184,168 A | 11/1876 | Nickle | |
| 364,077 A | 5/1887 | Addis | |
| 514,715 A | 2/1894 | Jenkins | |
| 1,175,792 A * | 3/1916 | Mickelsen | .................... 414/687 |
| 1,249,194 A | 12/1917 | Race | |
| 1,264,867 A | 4/1918 | Schuh | |

(Continued)

FOREIGN PATENT DOCUMENTS

| | | |
|---|---|---|
| EP | 0024433 A1 | 3/1981 |
| GB | 727780 A | 4/1955 |

(Continued)

OTHER PUBLICATIONS

U.S. Appl. No. 13/335,794, filed Dec. 22, 2011; titled "Fast Transportable Drilling Rig System" and having common inventors with the present patent application.

(Continued)

*Primary Examiner* — Gregory Adams
(74) *Attorney, Agent, or Firm* — John G. Fischer, Esq.; Paul D. Lein, Esq.; Scheef & Stone, L.L.P.

(57) ABSTRACT

A pipe handling apparatus for moving a pipe from a stowed position to a position deployed above a wellhead has a main rotating structural member pivotally movable between a first position and a second position, an arm interconnected to the main rotating structural member, a gripper affixed to an end of the arm opposite the main rotating structural member, and a tensioner connected to the gripper for applying a tension to the gripper when the arm is in the extended position. The gripper grips a surface of a pipe. The arm is pivotable between a home position and an extended position. The tensioning means has a guy wire connected at one end to the gripper. The guy wire has an opposite end connected to the arm. Alternatively, the opposite end is connected to the main rotating structural member.

17 Claims, 9 Drawing Sheets

U.S. PATENT DOCUMENTS

| | | | |
|---|---|---|---|
| 1,312,009 A | 8/1919 | Thrift | |
| 1,318,789 A | 10/1919 | Moschel | |
| 1,369,165 A | 2/1921 | Cochran et al. | |
| 1,396,317 A | 11/1921 | Boyter | |
| 1,417,490 A | 5/1922 | Brandon | |
| 1,483,037 A | 2/1924 | Zallinger | |
| 1,768,861 A | 7/1930 | Richards | |
| 1,972,635 A | 9/1934 | Whinnen | |
| 1,981,304 A | 11/1934 | Brandt | |
| 2,124,154 A | 7/1937 | Sovincz | |
| 2,147,002 A | 2/1939 | Volpin | |
| 2,327,461 A | 8/1943 | Rowe | |
| 2,328,197 A | 8/1943 | Cowin | |
| 2,369,534 A | 2/1945 | Cohen | |
| 2,382,767 A | 8/1945 | Zeilman | |
| 2,476,210 A | 7/1949 | Moore | |
| 2,497,083 A * | 2/1950 | Hildebrand | 188/314 |
| 2,509,853 A | 5/1950 | Wilson | |
| 2,535,054 A | 12/1950 | Ernst et al. | |
| 2,595,307 A | 5/1952 | Selberg | |
| 2,592,168 A | 8/1952 | Morris et al. | |
| 2,710,431 A | 6/1955 | Griffon | |
| 2,715,014 A | 8/1955 | Garnett et al. | |
| 2,770,493 A | 11/1956 | Fieber | |
| 2,814,396 A * | 11/1957 | Neale, Sr. | 414/23 |
| 2,828,024 A * | 3/1958 | True | 414/22.51 |
| 2,840,244 A | 6/1958 | Thomas, Jr. | |
| 2,937,726 A | 5/1960 | Manfred et al. | |
| 3,016,992 A | 1/1962 | Wilson | |
| 3,033,529 A | 5/1962 | Pierrat | |
| 3,059,905 A | 10/1962 | Tompkins | |
| 3,076,560 A | 2/1963 | Bushong et al. | |
| 3,136,394 A | 6/1964 | Woolslayer et al. | |
| 3,177,944 A | 4/1965 | Knights | |
| 3,180,496 A | 4/1965 | Smith | |
| 3,194,313 A | 7/1965 | Fanshawe | |
| 3,262,593 A | 7/1966 | Hainer | |
| 3,280,920 A | 10/1966 | Scott | |
| 3,290,006 A | 12/1966 | Dubberke | |
| 3,331,585 A | 7/1967 | Dubberke | |
| 3,365,762 A | 1/1968 | Spiri | |
| 3,421,269 A | 1/1969 | Medow | |
| 3,432,159 A | 3/1969 | Rakatansky | |
| 3,464,507 A | 9/1969 | Alexander et al. | |
| 3,477,522 A | 11/1969 | Templeton | |
| 3,498,375 A | 3/1970 | McEwen et al. | |
| 3,559,821 A | 2/1971 | James | |
| 3,561,811 A | 2/1971 | Turner, Jr. | |
| 3,633,771 A | 1/1972 | Woolslayer et al. | |
| 3,675,303 A | 7/1972 | McKinnon | |
| 3,682,259 A | 8/1972 | Cintract et al. | |
| 3,702,640 A | 11/1972 | Cintract et al. | |
| 3,703,968 A | 11/1972 | Uhrich et al. | |
| 3,706,347 A | 12/1972 | Brown | |
| 3,774,781 A * | 11/1973 | Merkley | 414/23 |
| 3,792,783 A | 2/1974 | Brown | |
| 3,797,672 A | 3/1974 | Vermette | |
| 3,804,264 A | 4/1974 | Hedeen et al. | |
| 3,805,463 A | 4/1974 | Lang et al. | |
| 3,806,021 A | 4/1974 | Moroz et al. | |
| 3,823,916 A | 7/1974 | Shaw | |
| 3,848,850 A | 11/1974 | Bemis | |
| 3,860,122 A | 1/1975 | Cernosek | |
| 3,883,009 A | 5/1975 | Swoboda et al. | |
| 3,942,593 A | 3/1976 | Reeve, Jr. et al. | |
| 3,963,133 A | 6/1976 | Gilli | |
| 3,986,619 A * | 10/1976 | Woolslayer et al. | 414/22.55 |
| 3,991,887 A | 11/1976 | Trout | |
| 3,995,746 A * | 12/1976 | Usagida | 414/738 |
| 4,007,782 A | 2/1977 | Nybo et al. | |
| 4,011,694 A | 3/1977 | Langford | |
| 4,030,698 A | 6/1977 | Hansen | |
| 4,044,952 A | 8/1977 | Williams et al. | |
| 4,135,340 A | 1/1979 | Cox et al. | |
| 4,142,551 A | 3/1979 | Wilms | |
| 4,158,283 A | 6/1979 | Nation | |
| 4,172,684 A | 10/1979 | Jenkins | |
| 4,201,022 A | 5/1980 | Jennings | |
| 4,221,269 A | 9/1980 | Hudson | |
| 4,269,554 A | 5/1981 | Jackson | |
| 4,276,918 A | 7/1981 | Sigouin | |
| 4,277,044 A | 7/1981 | Hamilton | |
| 4,290,495 A | 9/1981 | Elliston | |
| 4,303,270 A | 12/1981 | Adair | |
| 4,336,840 A | 6/1982 | Bailey | |
| 4,359,089 A | 11/1982 | Strate et al. | |
| 4,386,883 A | 6/1983 | Hogan et al. | |
| 4,403,666 A | 9/1983 | Willis | |
| 4,403,897 A | 9/1983 | Willis | |
| 4,403,898 A | 9/1983 | Thompson | |
| 4,407,629 A | 10/1983 | Willis | |
| 4,420,917 A | 12/1983 | Parlanti | |
| 4,426,182 A | 1/1984 | Frias et al. | |
| 4,440,536 A | 4/1984 | Scaggs | |
| 4,492,501 A | 1/1985 | Haney | |
| 4,529,094 A | 7/1985 | Wadsworth | |
| 4,547,110 A | 10/1985 | Davidson et al. | |
| 4,595,066 A | 6/1986 | Nelmark et al. | |
| 4,598,509 A | 7/1986 | Woolslayer et al. | |
| 4,604,724 A | 8/1986 | Shaginian et al. | |
| 4,605,077 A | 8/1986 | Boyadjieff | |
| 4,650,237 A | 3/1987 | Lessway | |
| 4,658,970 A | 4/1987 | Oliphant | |
| 4,688,983 A | 8/1987 | Lindbom | |
| 4,708,581 A | 11/1987 | Adair | |
| 4,756,204 A | 7/1988 | Wittwer et al. | |
| 4,759,414 A | 7/1988 | Willis | |
| 4,765,225 A | 8/1988 | Birchard | |
| 4,765,401 A | 8/1988 | Boyadjieff | |
| 4,767,100 A | 8/1988 | Philpot | |
| 4,822,230 A | 4/1989 | Slettedal | |
| 4,834,604 A | 5/1989 | Brittain et al. | |
| 4,837,992 A | 6/1989 | Hashimoto | |
| 4,869,137 A | 9/1989 | Slator | |
| 4,982,853 A | 1/1991 | Kishi | |
| 5,060,762 A | 10/1991 | White | |
| 5,121,793 A | 6/1992 | Busch et al. | |
| 5,135,119 A | 8/1992 | Larkin | |
| 5,150,642 A | 9/1992 | Moody et al. | |
| 5,186,264 A | 2/1993 | Du Chaffaut | |
| 5,415,057 A * | 5/1995 | Nihei et al. | 74/490.01 |
| 5,458,454 A | 10/1995 | Sorokan | |
| 5,595,248 A | 1/1997 | Denny | |
| 5,597,987 A | 1/1997 | Gilliland et al. | |
| 5,609,226 A | 3/1997 | Penisson | |
| 5,609,260 A | 3/1997 | Liao | |
| 5,609,457 A | 3/1997 | Burns | |
| 5,649,745 A | 7/1997 | Anderson | |
| 5,660,087 A | 8/1997 | Rae | |
| 5,671,932 A | 9/1997 | Chapman | |
| 5,702,139 A | 12/1997 | Buck | |
| 5,806,589 A | 9/1998 | Lang | |
| 5,816,565 A | 10/1998 | McGuffin | |
| 5,848,647 A | 12/1998 | Webre et al. | |
| 5,931,238 A * | 8/1999 | Gilmore et al. | 175/52 |
| 5,934,028 A | 8/1999 | Taylor | |
| 5,957,431 A | 9/1999 | Serda, Jr. | |
| 5,964,550 A | 10/1999 | Blandford et al. | |
| 5,988,299 A | 11/1999 | Hansen et al. | |
| 5,992,801 A | 11/1999 | Torres | |
| 5,993,140 A | 11/1999 | Crippa | |
| 6,003,598 A | 12/1999 | Andreychuk | |
| 6,047,771 A | 4/2000 | Roynestad | |
| 6,053,255 A | 4/2000 | Crain | |
| 6,079,490 A | 6/2000 | Newman | |
| 6,079,925 A | 6/2000 | Morgan et al. | |
| 6,158,516 A | 12/2000 | Smith et al. | |
| 6,220,807 B1 | 4/2001 | Sorokan | |
| 6,227,587 B1 | 5/2001 | Terral | |
| 6,234,253 B1 | 5/2001 | Dallas | |
| 6,237,445 B1 | 5/2001 | Wesch, Jr. | |
| 6,253,845 B1 | 7/2001 | Belik | |
| 6,263,763 B1 | 7/2001 | Feigel, Jr. et al. | |
| 6,264,128 B1 | 7/2001 | Shampine et al. | |
| 6,264,395 B1 | 7/2001 | Allamon et al. | |
| 6,276,450 B1 | 8/2001 | Seneviratne | |
| 6,279,662 B1 | 8/2001 | Sonnier | |

| | | |
|---|---|---|
| 6,298,928 B1 | 10/2001 | Penchansky |
| 6,311,788 B1 | 11/2001 | Weixler |
| 6,343,892 B1 | 2/2002 | Kristiansen |
| 6,398,186 B1 | 6/2002 | Lemoine |
| 6,431,286 B1 | 8/2002 | Andreychuk |
| 6,471,439 B2 | 10/2002 | Allamon et al. |
| 6,502,641 B1 | 1/2003 | Carriere et al. |
| 6,524,049 B1 | 2/2003 | Minnes |
| 6,533,045 B1 | 3/2003 | Cooper |
| 6,543,551 B1 | 4/2003 | Sparks et al. |
| 6,543,555 B1 | 4/2003 | Casagrande |
| 6,550,128 B1 | 4/2003 | Lorenz |
| 6,557,641 B2 | 5/2003 | Sipos et al. |
| 6,564,667 B2 | 5/2003 | Bayer et al. |
| 6,581,698 B1 | 6/2003 | Dirks |
| 6,609,573 B1 | 8/2003 | Day |
| 6,705,414 B2 | 3/2004 | Simpson et al. |
| 6,745,646 B1 | 6/2004 | Pietras et al. |
| 6,748,823 B2 | 6/2004 | Pietras |
| 6,763,898 B1 | 7/2004 | Roodenburg et al. |
| 6,779,614 B2 | 8/2004 | Oser |
| 6,814,149 B2 | 11/2004 | Liess et al. |
| 6,845,814 B2 | 1/2005 | Mason et al. |
| 6,854,520 B1 | 2/2005 | Robichaux |
| 6,969,223 B2 | 11/2005 | Tolmon et al. |
| 7,017,450 B2 | 3/2006 | Bangert |
| 7,021,880 B2 | 4/2006 | Morelli et al. |
| 7,028,585 B2 | 4/2006 | Pietras et al. |
| 7,036,202 B2 | 5/2006 | Lorenz |
| 7,040,411 B2 | 5/2006 | Kainer et al. |
| 7,044,315 B2 | 5/2006 | Willim |
| 7,055,594 B1 | 6/2006 | Springett et al. |
| 7,077,209 B2 | 7/2006 | McCulloch et al. |
| 7,090,035 B2 | 8/2006 | Lesko |
| 7,090,254 B1 | 8/2006 | Pietras et al. |
| 7,117,938 B2 | 10/2006 | Hamilton et al. |
| 7,121,166 B2 | 10/2006 | Drzewiecki |
| 7,172,038 B2 | 2/2007 | Terry et al. |
| 7,249,639 B2 | 7/2007 | Belik |
| 7,289,871 B2 | 10/2007 | Williams |
| 7,296,623 B2 | 11/2007 | Koithan et al. |
| 7,398,833 B2 | 7/2008 | Ramey et al. |
| 7,438,127 B2 | 10/2008 | Lesko |
| 7,503,394 B2 | 3/2009 | Bouligny |
| 7,726,929 B1 * | 6/2010 | Orgeron .............. 414/22.55 |
| 7,918,636 B1 | 4/2011 | Orgeron |
| 7,946,795 B2 | 5/2011 | Orgeron |
| 7,980,802 B2 | 7/2011 | Orgeron |
| 8,011,426 B1 | 9/2011 | Orgeron |
| 8,128,332 B2 | 3/2012 | Orgeron |
| 8,172,497 B2 | 5/2012 | Orgeron et al. |
| 8,192,128 B2 | 6/2012 | Orgeron |
| 8,192,129 B2 | 6/2012 | Orgeron |
| 8,235,104 B1 | 8/2012 | Sigmar et al. |
| 2002/0070187 A1 | 6/2002 | Willim |
| 2002/0079105 A1 | 6/2002 | Bergeron |
| 2003/0170095 A1 | 9/2003 | Slettedal |
| 2003/0221871 A1 | 12/2003 | Hamilton et al. |
| 2004/0040926 A1 | 3/2004 | Irsch et al. |
| 2005/0269133 A1 | 12/2005 | Little |
| 2006/0016775 A1 | 1/2006 | Willim |
| 2006/0027793 A1 | 2/2006 | Kysely |
| 2006/0045654 A1 | 3/2006 | Guidroz |
| 2006/0151215 A1 * | 7/2006 | Skogerbo .............. 175/52 |
| 2006/0278400 A1 | 12/2006 | Bouligny |
| 2007/0074460 A1 | 4/2007 | Belik |
| 2008/0023432 A1 | 1/2008 | Paschke |
| 2008/0078965 A1 | 4/2008 | Lane et al. |
| 2008/0174131 A1 | 7/2008 | Bouligny et al. |
| 2008/0202812 A1 | 8/2008 | Childers et al. |
| 2008/0253866 A1 * | 10/2008 | Lops et al. .............. 414/22.55 |
| 2009/0071720 A1 | 3/2009 | Cowan |
| 2009/0232624 A1 | 9/2009 | Orgeron |
| 2010/0032213 A1 | 2/2010 | Orgeron |
| 2010/0034619 A1 | 2/2010 | Orgeron |
| 2010/0034620 A1 | 2/2010 | Orgeron |
| 2010/0187740 A1 | 7/2010 | Orgeron |
| 2010/0230166 A1 | 9/2010 | Sigmar et al. |
| 2010/0254784 A1 | 10/2010 | Orgeron et al. |
| 2010/0296899 A1 | 11/2010 | Orgeron |
| 2011/0030942 A1 | 2/2011 | Orgeron |
| 2011/0200412 A1 | 8/2011 | Orgeron |
| 2012/0118639 A1 | 5/2012 | Gerber |
| 2012/0167485 A1 | 7/2012 | Trevithick et al. |
| 2012/0170998 A1 | 7/2012 | Orgeron |

FOREIGN PATENT DOCUMENTS

| | | | |
|---|---|---|---|
| GB | 2264736 A | * | 9/1993 |
| JP | 05044385 A | | 2/1993 |
| JP | 2001287127 A | | 10/2001 |
| WO | 9315303 A1 | | 8/1993 |
| WO | 02057593 A1 | | 7/2002 |
| WO | WO 2006038790 A1 | * | 4/2006 |

OTHER PUBLICATIONS

U.S. Appl. No. 12/111,907, filed Apr. 29, 2008; titled "Pipe Gripping Apparatus" and having common inventors with the present patent application.

U.S. Appl. No. 12/371,590, filed Feb. 14, 2009; titled "Tubular Gripping Apparatus" and having common inventors with the present patent application.

U.S. Appl. No. 12/371,591, filed Feb. 14, 2009; titled "Gripping and Locking Method" and having common inventors with the present patent application.

U.S. Appl. No. 12/403,218, filed Mar. 12, 2009; titled "Derrickless Tubular Servicing System and Method" and having common inventors with the present patent application.

U.S. Appl. No. 12/418,302, filed Apr. 3, 2009; titled "Raise-Assist Pipe Handling" and having common inventors with the present patent application.

U.S. Appl. No. 12/469,598, filed May 20, 2009; titled "Alignment Apparatus and Method for a Boom of a Pipe Handling Apparatus" and having common inventors with the present patent application.

U.S. Appl. No. 12/632,261, filed Dec. 7, 2009; titled "Stabbing Apparatus and Method" and having common inventors with the present patent application.

U.S. Appl. No. 12/633,891, filed Dec. 9, 2009; titled "Stabbing Apparatus for Centering Tubulars and Casings for Connection at a Wellhead" and having common inventors with the present patent application.

U.S. Appl. No. 12/633,913, filed Dec. 9, 2009; titled "Apparatus for a Pipe Tong and Spinner Deployment" and having common inventors with the present patent application.

U.S. Appl. No. 12/789,332, filed May 27, 2010; titled "Pipe Handling Boom Pretensioning Appratus" and having common inventors with the present patent application.

U.S. Appl. No. 13/114,842, filed May 24, 2011; titled "Telescoping Jack for a Gripper Assembly" and having common inventors with the present patent application.

U.S. Appl. No. 13/226,343, filed Sep. 6, 2011; titled "Method of Gripping a Tubular With a Tubular Gripping Mechanism" and having common inventors with the present patent application.

Chronis, Nicholas P.; Mechanisms & Mechanical Devices Sourcebook, 1991, Ch. 10, pp. 399-414, ISBN 0-07-010918-4, McGraw-Hill, Inc.

* cited by examiner

PIPE HANDLING APPARATUS WITH STAB FRAME STIFFENING

CROSS-REFERENCE TO RELATED APPLICATIONS

The present application is a continuation-in-part of U.S. application Ser. No. 12/013,979, filed on Jan. 14, 2008, entitled "Pipe Handling and Casing Stabbing Apparatus and Method", presently pending. U.S. application Ser. No. 12/013,979 is a continuation-in-part of U.S. application Ser. No. 11/923,451, filed on Oct. 24, 2007, entitled "Pipe Handling Apparatus and Method", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the delivery of tubulars from a horizontal orientation to a vertical orientation at a wellhead. More particularly, the present invention relates to a pipe handling apparatus that positions tubulars at a wellhead. More particularly, the present invention relates to controlling undesirable forces that are created while positioning a tubular at a wellhead.

2. Description of Related Art Including Information Disclosed Under 37 CFR 1.97 and 37 CFR 1.98.

Drill rigs have utilized several methods for transferring tubular members from a pipe rack adjacent to the drill floor to a mousehole in the drill floor or the well bore for connection to a previously transferred tubular or tubular string. The term "tubular" as used herein includes all forms of pipe, drill pipe, drill collars, casing, liner, bottom hole assemblies (BHA), and other types of tubulars known in the art.

Conventionally, drill rigs have utilized a combination of the rig cranes and the traveling system for transferring a tubular from the pipe rack to a vertical position above the center of the well. The obvious disadvantage with the prior art systems is that there is a significant manual involvement in attaching the pipe elevators to the tubular and moving the pipe from the drill rack to the rotary table at the well head. This manual transfer operation in the vicinity of workers is potentially dangerous and has caused numerous injuries in drilling operations. Further, the hoisting system may allow the tubular to come into contact with the catwalk or other portions of the rig as the tubular is transferred from the pipe rack to the drill floor. This can damage the tubular and may affect the integrity of the connections between successive tubulars in the well.

One method of transferring pipe from the rack to the well platform comprises tying one end of a line on the rig around a selected pipe on the pipe rack. The pipe is thereafter lifted up onto the platform and the lower end thereof is placed into the mousehole. The mousehole is simply an upright, elongate cylindrical container adjacent to the rotary table which supports the pipe temporarily. When it is necessary to add the pipe to the drill string, slips are secured about the drill string on the rotary table thereby supporting the same in the well bore. The pipe is disconnected from the traveling equipment, and the elevators, or the kelly, are connected to the pipe in the mousehole. Next, the traveling block is raised by positioning the pipe over the drill string. Tongs are used to secure the pipe to the upper end of the drill string. The drill pipe elevators suspend the drill pipe from a collar, which is formed around one end of the pipe and does not clamp the pipe, thereby permitting rotational pipe movement in order to threadably engage the same to the drill string.

A prior art technique for moving joints of casing from racks adjacent to the drilling rig comprises tying a line from the rig onto one end of a selected casing joint on the rack. The line is raised by lifting the casing joint up a ramp leading to the rig platform. As the rope lifts the casing from the rack, the lower end of the casing swings across the platform in a dangerous manner. The danger increases when a floating system is used in connection with drilling. Because the rope is tied around the casing at one end thereof, the casing does not hang vertically, but rather tilts somewhat. A man working on a platform elevated above the rig floor must hold the top of the casing and straighten it out while the casing is threaded into the casing string which is suspended in the well bore by slips positioned on the rotary table.

It is desirable to be able to grip casing or pipe positioned on a rack adjacent a drilling well, move the same into vertical orientation over the well bore, and thereafter lower the same onto the string suspended in the well bore.

In the past, various devices have been created which mechanically move a pipe from a horizontal orientation to a vertical orientation such that the vertically-oriented pipe can be installed into the well bore. Typically, these devices have utilized several interconnected arms that are associated with a boom. In order to move the pipe, a succession of individual movements of the levers, arms, and other components of the boom must be performed in a coordinated manner in order to achieve the desired result. Typically, a wide variety of hydraulic actuators are connected to each of the components so as to carry out the prescribed movement. A complex control mechanism is connected to each of these actuators so as to achieve the desired movement. Advanced programing is required of the controller in order to properly coordinate the movements in order to achieve this desired result.

Unfortunately, with such systems, the hydraulic actuators, along with other components, can become worn with time. Furthermore, the hydraulic integrity of each of the actuators can become compromised over time. As such, small variations in each of the actuators can occur. These variations, as they occur, can make the complex mechanism rather inaccurate. The failure of one hydraulic component can exacerbate the problems associated with the alignment of the pipe in a vertical orientation. Adjustments of the programming are often necessary to as to continue to achieve the desired results. Fundamentally, the more hydraulic actuators that are incorporated into such a system, the more likely it is to have errors, inaccuracies, and deviations in the desired delivery profile of the tubular. Typically, very experienced and knowledgeable operators are required so as to carry out this pipe movement operation. This adds significantly to the cost associated with pipe delivery.

In the past, pipe handling apparatus have not been used for the installation of casing. The problem associated with casing is that the threads of the casing are formed on an inner wall and on an outer wall at the ends of each of the casing sections. Whenever these threads are formed, the relatively thin wall thickness of the casing is further minimized. Additionally, great precision is required so as to properly thread the threads of one casing section within the threads of an adjacent casing section. The amount of accuracy required for the delivery of the casing by a pipe handling apparatus, in the past, has not been sufficient so as to achieve the desired degree of accuracy for the installation of the casing sections in their threaded connection. The improper installation of one casing section upon another casing section can potentially damage the threads associated with such casing sections. Additionally, in the past, the pipe handling apparatus could potentially damage the thin-walled casing sections during the delivery. As such, a need has developed to adapt a pipe handling apparatus so as to achieve the desired amount of accuracy for the installation of casing sections.

To address these problems and needs, U.S. application Ser. No. 11/923,451, filed on Oct. 24, 2007 by the present inventor, discloses a pipe handling apparatus that has a boom pivotally movable between a first position and a second position, a riser assembly pivotally connected to the boom, an arm pivotally connected at one end to the first portion of the riser assembly and extending outwardly therefrom, a gripper affixed to a opposite end of the arm suitable for gripping a diameter of the pipe, a link pivotally connected to the riser assembly and pivotable so as to move relative to the movement of the boom between the first and second positions, and a brace having one end pivotally connected to the boom and an opposite end pivotally connected to the arm between the ends of the arm. The riser assembly has a first portion extending outwardly at an obtuse angle with respect to the second portion.

The pipe handling apparatus delivers a pipe to a wellhead when in the second position. Pipes can be of extraordinary lengths and weights. As the apparatus arrives in the second position, where the pipe is vertically oriented over the wellhead, the extraordinary weight of a long pipe causes stresses to be created between the gripper and the arm. In some instances, the gripper can bend relative to the arm even if the gripper and arm are fixedly connected. In other instances, the arm may bow in response to the weight of a long pipe held by the gripper. The stresses created by long pipes that are exerted on the gripper and the arm can weaken the connection between the gripper and the arm and also weaken the gripper and the arm themselves. Thus, long lengths of pipe with extraordinary weights can reduce the useful life of the pipe handling apparatus and cause premature fatigue or failure of the component parts of the apparatus. Thus, there is need to reduce the stresses upon the gripper and arm, and the rest of the pipe handling apparatus, that are created by delivering long lengths of extraordinarily heavy pipe to a wellhead in the second position. Another problem associated with the delivery of long lengths of pipe to a wellhead is that, when the gripper and arm bend in response to the stresses created by the pipe, the pipe then becomes off center and non-vertical. Thus, the pipe is not vertically oriented and not precisely aligned with the pipe or casing that is at the wellhead. Thus, there is a need for a pipe handling apparatus that can compensate for variations in the orientation of long lengths of pipe when delivered over a wellhead.

Various patents and patent applications relate to apparatus and methods for stiffening and improving the integrity of a pipe handling apparatus. For example, U.S. patent application Ser. No. 12/013,979, filed on Jan. 14, 2008 by the present inventor, discloses a pre-loading system for a pipe handling apparatus in which a boom is pivotally mounted at one end to a skid and in which an arm is interconnected to an opposite end of the boom. The pre-loading system has a tensioning system with one end affixed to the arm and an opposite end fixedly mounted so as to apply tension to the arm when the arm has a load applied to an end of the arm opposite the boom. The tensioning system includes a first cable assembly having one end interconnected to the arm and an opposite end fixedly mounted, and a second cable assembly interconnected to the arm and having an opposite end fixedly mounted. The first and second cable assemblies extend from opposite sides of the arm.

U.S. patent application Ser. No. 11/923,451, filed on Oct. 24, 2007 by the present inventor, discloses a pipe handling apparatus that has a boom pivotally movable between a first position and a second position, a riser assembly pivotally connected to the boom, an arm pivotally connected at one end to the first portion of the riser assembly and extending outwardly therefrom, a gripper affixed to a opposite end of the arm suitable for gripping a diameter of the pipe, a link pivotally connected to the riser assembly and pivotable so as to move relative to the movement of the boom between the first and second positions, and a brace having a one end pivotally connected to the boom and an opposite end pivotally to the arm between the ends of the arm. The riser assembly has a first portion extending outwardly at an obtuse angle with respect to the second portion.

U.S. Pat. No. 3,177,944, issued on Apr. 13, 1965 to R. N. Knight, describes a racking mechanism for earth-boring equipment that provides for horizontal storage of pipe lengths on one side of and clear of the derrick. This is achieved by means of a transport arm which is pivoted toward the base of the derrick for swing movement in a vertical plane. The outer end of the arm works between a substantially vertical position in which it can accept a pipe length from, or deliver a pipe length to, a station in the derrick, and a substantially horizontal portion in which the arm can deliver a pipe length to, or accept a pipe length from, a station associated with storage means on one side of the derrick.

U.S. Pat. No. 3,464,507, issued on Sep. 2, 1969 to E. L. Alexander et al., teaches a portable rotary pipe handling system. This system includes a mast pivotally mounted and movable between a reclining transport position to a desired position at the site drilling operations which may be at any angle up to vertical. The mast has guides for a traveling mechanism that includes a block movable up and down the mast through operation of cables reeved from the traveling block over crown block pulleys into a drawwork. A power drill drive is carried by the traveling block. An elevator for drill pipe is carried by an arm swingably mounted relative to the power unit. Power tongs, slips, and slip bushings are supported adjacent the lower end of the mast and adapted to have a drill pipe extend therethrough from a drive bushing connected to a power drive whereby the drill pipe is extended in the direction of the hole to be drilled.

U.S. Pat. No. 3,633,771, issued on Jan. 11, 1972 to Woolslayer et al., discloses an apparatus for moving drill pipe into and out of an oil well derrick. A stand of pipe is gripped by a strongback which is pivotally mounted to one end of a boom. The boom swings the strongback over the rotary table thereby vertically aligning the pipe stand with the drill string. When both adding pipe to and removing pipe from the drill string, all vertical movement of the pipe is accomplished by the elevator suspended from the traveling block.

U.S. Pat. No. 3,860,122, issued on Jan. 14, 1975 to L. C. Cernosek, describes an apparatus for transferring a tubular member, such as a pipe, from a storage area to an oil well drilling platform. The positioning apparatus includes a pipe positioner mounted on a platform for moving the pipe to a release position whereby the pipe can be released to be lowered to a submerged position. A loader is operably attached or associated with the platform and a positioner in order to move the pipe from a stored position to a transfer position in which the pipe is transferred to the positioner. The positioner includes a tower having a pipe track pivotally mounted thereon with pipe clamp assemblies which are adapted to receive a pipe length. The pipe track is pivotally movable by a hydraulic power mechanism or gear mechanism between a transfer position in which pipe is moved into the clamp assemblies and the release position in which the pipe is released for movement to a submerged position.

U.S. Pat. No. 3,986,619, issued on Oct. 19, 1976 to Woolslayer et al., shows a pipe handling apparatus for an oil well drilling derrick. An inner end of the boom is pivotally supported on a horizontal axis in front of a well. A clamp is pivotally connected to the outer end of the boom on an axis parallel to the horizontal axis at one end. The clamp allows the free end of the drill pipe to swing across the boom as the outer end of the boom is raised or lowered. A line is connected at one end with the traveling block that raises and lowers the elevators and at the other end to the boom so as to pass around sheaves.

U.S. Pat. No. 4,172,684, issued on Oct. 30, 1979 to C. Jenkins, shows a floor-level pipe handling apparatus which is mounted on the floor of an oil well derrick. The apparatus includes a support that is rockable on an axis perpendicular to the centerline of a well being drilled. One end of an arm is pivotally mounted on the support on an axis transverse to the centerline of the well. The opposite end of the arm carries a pair of shoes having laterally opening pipe-receiving seats facing away from the arm. The free end of the arm can be swung toward and away from the well centerline and the arm support can be rocked to swing the arm laterally.

U.S. Pat. No. 4,403,666, issued on Sep. 13, 1983 to C. A. Willis, shows self-centering tongs and a transfer arm for a drilling apparatus. The clamps of the transfer arm are resiliently mounted to the transfer arm so as to provide limited axial movement of the clamps and thereby of a clamped down hole tubular. A pair of automatic, self-centering, hydraulic tongs are provided for making up and breaking out threaded connections of tubulars.

U.S. Pat. No. 4,407,629, issued on Oct. 4, 1983 to C. A. Willis, teaches a lifting apparatus for downhole tubulars. This lifting apparatus includes two rotatably mounted clamps which are rotatable between a side-loading position so as to facilitate the loading and unloading in the horizontal position, and a central position, in which a clamped tubular is aligned with the drilling axis when the boom is in the vertical position. An automatic hydraulic sequencing circuit is provided to automatically rotate the clamps into the side-loading position whenever the boom is pivoted with a downhole tubular positioned in the clamp. In this position, the clamped tubular is aligned with a safety plate mounted on the boom to prevent a clamped tubular from slipping from the clamps.

U.S. Pat. No. 4,492,501 provides a platform positioning system for a drilling operation which includes a support structure and a transfer arm pivotally connected to the support structure to rotate about a first axis. This platform positioning system includes a platform which is pivotally connected to the support structure to rotate about a second axis, and a rod which is mounted between the transfer arm and the platform. The position of the arm and platform axes and the length of the rod are selected such that the transfer arm automatically and progressively raises the platform to the raised position by means of the rod as the transfer arm moves to the raised position. The transfer arm automatically and progressively lowers the platform to the lowered position by means of the rod as the transfer arm moves to the lowered position.

U.S. Pat. No. 4,595,066, issued on Jun. 17, 1986 to Nelmark et al., provides an apparatus for handling drill pipes and used in association with blast holes. This system allows a drill pipe to be more easily connected and disconnected to a drill string in a hole being drilled at an angle. A receptacle is formed at the lower end of the carrier that has hydraulically-operated doors secured by a hydraulically-operated lock. A gate near the upper end is pneumatically operated in response to the hydraulic operation of the receptacle lock.

U.S. Pat. No. 4,822,230, issued on Apr. 18, 1989 to P. Slettedal, teaches a pipe handling apparatus which is adapted for automated drilling operations. Drill pipes are manipulated between substantially horizontal and vertical positions. The apparatus is used with a top mounted drilling device which is rotatable about a substantially horizontal axis. The apparatus utilizes a strongback provided with clamps to hold and manipulate pipes. The strongback is rotatably connected to the same axis as the drilling device. The strongback moves up or down with the drilling device. A brace unit is attached to the strongback to be rotatable about a second axis.

U.S. Pat. No. 4,834,604, issued on May 30, 1989 to Brittain et al., provides a pipe moving apparatus and method for moving casing or pipe from a horizontal position adjacent a well to a vertical position over the well bore. The machine includes a boom movable between a lowered position and a raised position by a hydraulic ram. A strongback grips the pipe and holds the same until the pipe is vertically positioned. Thereafter, a hydraulic ram on the strongback is actuated thereby lowering the pipe or casing onto the string suspended in the well bore and the additional pipe or casing joint is threaded thereto.

U.S. Pat. No. 4,708,581 issued on Nov. 24, 1987 H. L. Adair, provides a method for positioning a transfer arm for the movement of drill pipe. A drilling mast and a transfer arm are mounted at a first axis adjacent the mast to move between a lowered position near ground level and an upper position aligned with the mast. A reaction point anchor is fixed with respect to the drilling mast and spaced from the first axis. A fixed length link is pivotably mounted to the transfer arm at a second axis, spaced from the first axis, and a first single stage cylinder is pivotably mounted at one end to the distal end of the link and at the other end to the transfer arm. A second single stage hydraulic cylinder is pivotably mounted at one end to the distal end of the link and at the other end to the reaction point.

U.S. Pat. No. 4,759,414, issued on Jul. 26, 1988 to C. A. Willis, provides a drilling machine which includes a drilling superstructure skid which defines two spaced-apart parallel skid runners and a platform. The platform supports a drawworks mounted on a drawworks skid and a pipe boom is mounted on a pipe boom skid sized to fit between the skid runners of the drilling substructure skid. The drilling substructure skid supports four legs which, in turn, support a drilling platform on which is mounted a lower mast section. The pipe boom skid mounts a pipe boom as well as a boom linkage, a motor, and a hydraulic pump adapted to power the pipe boom linkage. Mechanical position locks hold the upper skid in relative position over the lower skid.

U.S. Pat. No. 5,458,454, issued on Oct. 17, 1995 to R. S. Sorokan, describes a pipe handling method which is used to move tubulars used from a horizontal position on a pipe rack adjacent the well bore to a vertical position over the well center. This method utilizes bicep and forearm assemblies and a gripper head for attachment to the tubular. The path of the tubular being moved is close to the conventional path of the tubular utilizing known cable transfer techniques so as to allow access to the drill floor through the V-door of the drill rig. U.S. Pat. No. 6,220,807 describes an apparatus for carrying out the method of U.S. Pat. No. 5,458,454.

U.S. Pat. No. 6,609,573, issued on Aug. 26, 2003 to H. W. F. Day, teaches a pipe handling system for an offshore structure. The pipe handling system transfers the pipes from a horizontal pipe rack adjacent to the drill floor to a vertical orientation in a set-back area of the drill floor where the drill string is made up for lowering downhole. The cantilevered drill floor is utilized with the pipe handling system so as to save platform space.

U.S. Pat. No. 6,705,414, issued on Mar. 16, 2004 to Simpson et al., describes a tubular transfer system for moving pipe between a substantial horizontal position on the catwalk and a substantially vertical position at the rig floor entry. Bundles of individual tubulars are moved to a process area where a stand make-up/break-out machine makes up the tubular stands. The bucking machine aligns and stabs the connections and makes up the connection to the correct torque. The tubular stand is then transferred from the machine to a stand storage area. A trolley is moved into position over the pick-up area to retrieve the stands. The stands are clamped to the trolley and the trolley is moved from a substantially horizontal position to a substantially vertical position at the rig floor entry. A vertical pipe-racking machine transfers the stands to the traveling equipment. The traveling equipment makes up the stand connection and the stand is run into the hole.

U.S. Pat. No. 6,779,614, issued on Aug. 24, 2004 to M. S. Oser, shows another system and method for transferring pipe. A pipe shuttle is used for moving a pipe joint into a first position and then lifting upwardly toward an upper second position.

It is an object of the present invention to provide a pipe handling apparatus that can deliver long lengths of pipe to a wellhead.

It is another object of the present invention to minimize the amount of calibration required when moving a pipe from a horizontal orientation to a vertical orientation with the pipe handling apparatus.

It is another object of the present invention to provide a pipe handling apparatus that has increased durability.

It is still another object of the present invention to provide a pipe handling apparatus that has a longer useful life.

It is another object of the present invention to provide a pipe handling apparatus that operates within a single degree of freedom so as to move the pipe without adjustments between the components.

It is another object of the present invention to strengthen a pipe handling apparatus that delivers pipe to an existing derrick.

It is another object of the present invention to mitigate damages of the components of the pipe handling apparatus.

It is another object of the present invention to achieve greater precision in the delivery and installation of pipe and/or casing to a wellhead with a pipe handling apparatus.

It is still another object of the present invention to increase the structural stiffness of a pipe handling apparatus.

It is another object of the present invention to provide a pipe handling apparatus that can grip both long lengths of pipe and small lengths of pipe.

It is another object of the present invention to provide a pipe handling apparatus that utilizes different types of grippers.

It is still another object of the present invention to increase the lateral stiffness of the pipe handling apparatus.

It is another object of the present invention to increase the vertical stiffness of the pipe handling apparatus.

These and other objects and advantages of the present invention will become apparent from a reading of the attached specification and appended claims.

BRIEF SUMMARY OF THE INVENTION

The present invention is a pipe handling apparatus for moving a pipe from a stowed position to a position deployed above a wellhead. The apparatus comprises a main rotating structural member pivotally movable between a first position and a second position, an arm interconnected to the main rotating structural member, a gripper means affixed to an end of the arm opposite the main rotating structural member, and a tensioning means connected to the gripper means for applying a tension to the gripper means when the arm is in the extended position. The gripper means grips a surface of a pipe. The arm is pivotable between a home position and an extended position.

In one embodiment, the tensioning means comprises at least one guy wire connected at one end to the gripper means. The guy wire has an opposite end connected to the arm. The guy wire has a constant tension as the main structural member moves between the first and second positions.

In another embodiment, the tensioning means is connected at one end to the gripper means and at an opposite end to the main rotating structural member. The tensioning means comprises a guy wire. The guy wire has a minimum tension when the main rotating structural member is in the first position and a maximum tension when the main rotating structural member is in the second position. Alternatively, the tensioning means comprises a first guy wire affixed at one end to the main rotating structural member and an opposite end affixed to the gripper means, and a second guy wire affixed at one end to the main rotating structural member and an opposite end affixed to the gripper means. The first and second guy wires converge toward the gripper means.

In another embodiment, the gripper means comprises a stab frame affixed to the opposite end of the arm, a first gripper extending outwardly from a side of the stab frame opposite the arm, and a second gripper extending outwardly from the side of the stab frame opposite the arm the in spaced relation to set first gripper. The tensioning means is connected to the stab frame. The tensioning means comprises at least one guy wire connected at one end to the stab frame and an opposite end connected to the arm. Alternatively, the tensioning means comprises at least one guy wire connected at one end to the stab frame and an opposite end connected to the main rotating structural member. The stab frame comprises a first stab frame, and a second stab frame positioned below the first stab frame. The tensioning means is connected to the first stab frame.

The apparatus further comprises a lever assembly pivotally connected to the main rotating structural member where the lever assembly has a first portion that extends outwardly at an obtuse angle with respect to a second portion and where the arm is pivotally connected at one end to the first portion of the lever assembly and extends outwardly therefrom, at least one arm pivotally that is connected at one end to the first portion of the lever assembly and that extends outwardly therefrom, a gripper means affixed to an opposite end of the arm for gripping a surface of a pipe, a link pivotally connected to the second portion of the lever assembly where the link is pivotable at an end of the second portion opposite of the first portion so as to move relative to the movement of the main rotating structural member between the first and second positions, and a brace having an end pivotally connected to the main rotating structural member and an opposite end pivotally connected to the arm between the ends of the arm.

The present invention is a gripper assembly for a pipe handling apparatus comprising a stab frame, a gripper connected to the stab frame and extending outwardly therefrom where the gripper is suitable for gripping a surface of a pipe, an arm connected to the stab frame where the arm is movable between a first position and a second position, and a tensioning means connected to the stab frame for applying a tension force to the stab frame when the arm is in the second position.

In one embodiment, the tensioning means comprises at least one guy wire having an end affixed to the stab frame. The guy wire has an opposite end connected to the arm. In another embodiment, the gripper assembly further comprises a main structural member interconnected to the arm. The tensioning means is connected to the main structural member. The main structural member is pivotal between a first position and a second position. The tensioning means applies a maximum tension to the stab frame when the main structural member is in the second position. The tensioning means comprises at least one guy wire having an end connected adjacent an end of the main structural member and an opposite end connected to the stab frame. The guy wire extends angularly upwardly from the main structural member in the second position. Alternatively, the tensioning means comprises a first guy wire having one end affixed to the main structural member and an opposite end affixed to the gripper means, and a second guy wire having an end affixed to the main structural member and an opposite end affixed to the gripper means. The first and second guy wires converge toward the gripper means.

DETAILED DESCRIPTION OF THE INVENTION

Figure 1:
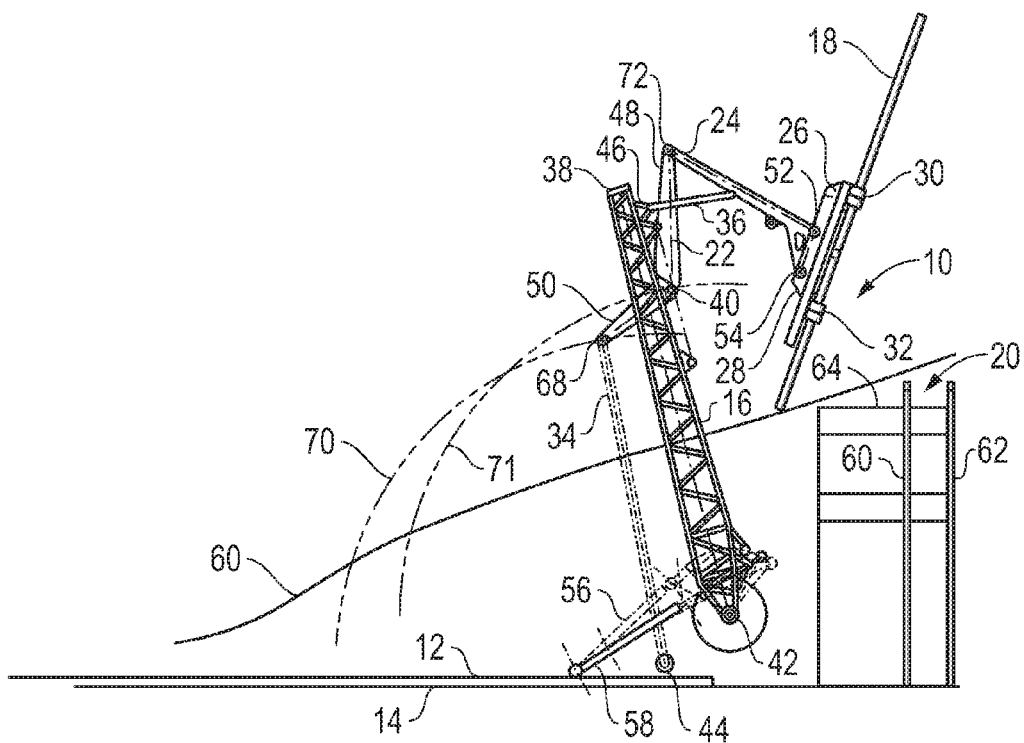
FIG. 1 is a side elevation view showing a pipe handling apparatus in accordance with the teachings of the present invention.

Referring to FIG. 1, there is shown the preferred embodiment of the pipe handling apparatus 10 in accordance with the system of the present invention. The pipe handling apparatus 10 is mounted on a skid 12 that is supported upon the bed 14 of a vehicle, such as a truck. The pipe handling apparatus 10 in particular includes a main rotating structural member 16 that is pivotally movable between a first position and a second position. In FIG. 1, an intermediate position of the pipe handling apparatus 10 is particularly shown. In this position, the pipe 18 is illustrated in its position prior to installation on the drill rig 20. A lever assembly 22 is pivotally connected to the main rotating structural member 16. An arm 24 is pivotally connected to an end of the lever assembly 22 opposite the main rotating structural member 16. A gripper means 26 is fixedly connected to an opposite end of the arm 24 opposite the lever assembly 22. The gripper means 26 includes a body 28 and grippers 30 and 32. A link 34 has one end pivotally connected to the skid 12 and an opposite end pivotally connected to the end of the lever assembly 22 opposite the arm 24. A brace 36 is pivotally connected to the main rotating structural member 16 and also pivotally connected to the arm 24 between the lever assembly 22 and the body 28 of gripper means 26.

In the present invention, the main rotating structural member 16 is a structural framework of struts, cross members and beams. In particular, in the present invention, the main rotating structural member 16 is configured so as to have an open interior such that the pipe 18 will be able to be lifted in a manner so as to pass through the interior of the main rotating structural member 16. As such, the end 38 of the main rotating structural member 16 should be strongly reinforced so as to provide the necessary structural integrity to the main rotating structural member 16. A lug 40 extends outwardly from one side of the main rotating structural member 16. This lug 40 is suitable for pivotable connection to the lever assembly 22. The main rotating structural member 16 is pivotally connected at the opposite end 42 to a location on the skid 12. The pivotable connection at end 42 of the main rotating structural member 16 is located in offset relationship and above the pivotable connection 44 of the link 34 with the skid 12. A small frame member 46 extends outwardly from the side of the main rotating structural member 16 opposite the link 34. This frame assembly 46 has a pivotable connection with the brace 36.

The lever assembly 22 includes a first portion 48 and a second portion 50. The first portion 48 extends at an obtuse angle with respect to the second portion 50. The link 34 is pivotally connected to the end of the second portion 50 opposite the first portion 48. The arm 24 is pivotally connected to the end of the first portion 48 opposite the second portion 50. The lug 40 of the main rotating structural member 16 is pivotally connected in an area generally between the first portion 48 and the second portion 50. This unique arrangement of the lever assembly 22 facilitates the ability of the present invention to carry out the movement of the pipe 18 between the horizontal orientation and the vertical orientation.

The arm 24 has an end pivotally connected to the end of the first portion 48 of the lever assembly 22. The opposite end of the arm 24 is connected to the gripper means 26. In particular, a pair of pin connections engage a surface of the body 28 of the gripper means 26 so as to fixedly position the gripper means 26 with respect to the end of the arm 24. The pin connections 52 and 54 can be in the nature of bolts, or other fasteners, so as to strongly connect the body 28 of the gripper means 26 with the arm 24. The bolts associated with pin connections 52 and 54 can be removed such that other gripper means 26 can be affixed to the end of the arm 24. As such, the pipe handling apparatus 10 of the present invention can be adaptable to various sizes of pipe 18 and various heights of drilling rigs 20.

The gripper means 26 includes the body 28 with the grippers 30 and 32 translatable along the length of the body 28. This vertical translation of the grippers 30 and 32 allows the pipe 18 to be properly moved upwardly and downwardly once the vertical orientation of the pipe 18 is achieved. The grippers 30 and 32 are in the nature of conventional grippers which can open and close so as to engage the outer diameter of the pipe 18, as desired.

The link 34 is an elongate member that extends from the pivotable connection 44 to the pivotable connection 68 of the second portion 50 of the lever assembly 22. The link 34 is non-extensible and extends generally adjacent to the opposite side from the main rotating structural member 16 from that of the arm 24. The link 34 will generally move relative to the movement of the main rotating structural member 16. The brace 36 is pivotally connected to the small framework 46 associated with main rotating structural member 16 and also pivotally connected at a location along the arm 26 between the ends thereof. Brace 36 provides structural support to the arm 24 and also facilitates the desired movement of the arm 24 during the movement of the pipe 18 between the horizontal orientation and the vertical orientation.

Actuators 56 and 58 are illustrated as having one end connected to the skid 12 and an opposite end connected to the main rotating structural member 16 in a location above the end 42. When the actuators 56 and 58 are activated, they will pivot the main rotating structural member 16 upwardly from the horizontal orientation ultimately to a position beyond vertical so as to cause the pipe 18 to achieve a vertical orientation. Within the concept of the present invention, a single hydraulic actuator can be utilized instead of the pair of hydraulic actuators 56 and 58, as illustrated in FIG. 1.

The drilling rig 20 is illustrated as having drill pipes 60 and 62 extending upwardly so as to have an end above the drill floor 64. When the pipe 18 is in its vertical orientation, the translatable movement of the grippers 30 and 32 can be utilized so as to cause the end of the pipe 18 to engage with the box of one of the drill pipes 60 and 62.

In FIG. 1, the general movement of the bottom end of the pipe 18 is illustrated by line 66. The movement of the pivot point 68 of the connection between the lever assembly 22 and the link 34 is illustrated by line 70. Curved line 71 illustrates the movement of the pivotable connection 40 between the main rotating structural member 16 and the lever assembly 22.

In the present invention, the coordinated movement of each of the non-extensible members of the apparatus 10 is achieved with proper sizing and angular relationships. In essence, the present invention provides a four-bar link between the various components. As a result, the movement of the drill pipe 18 between a horizontal orientation and a vertical orientation can be achieved purely through the mechanics associated with the various components. As can be seen, only a single hydraulic actuator may be necessary so as to achieve this desired movement. There does not need to be coordinated movement of hydraulic actuators. The hydraulic actuators are only used for the pivoting of the main rotating structural member. Since the skid 12 is located on the bed of a vehicle 14, the vehicle 14 can be maneuvered into place so as to properly align with the centerline of the drill pipe 60 and 62 of the drilling rig 20. Once the proper alignment is achieved by the vehicle 14, the apparatus 10 can be operated so as to effectively move the drill pipe to its desired position. The gripper assemblies of the present invention allow the drill pipe 18 to be moved upwardly and downwardly for the proper stabbing of the drill pipes 60 and 62. The present invention is adaptable to various links of pipe 18.

Various types of gripper means 26 can be installed on the end of the arm 24 so as to properly accommodate longer lengths of pipe 18. These variations are illustrated herein in connections FIGS. 6-9.

As such, instead of the complex control mechanisms that are required with prior art systems, the present invention achieves it results by simple maneuvering of the vehicle 14, along with operation of the hydraulic cylinders 56 and 58. All other linkages and movement of the pipe 18 are achieved purely because of the mechanical connections between the various components. As such, the present invention assures a precise, self-centering of the pipe 18 with respect to the desired connecting pipe. This is accomplished with only a single degree of freedom in the pipe handling system.

Figure 2:
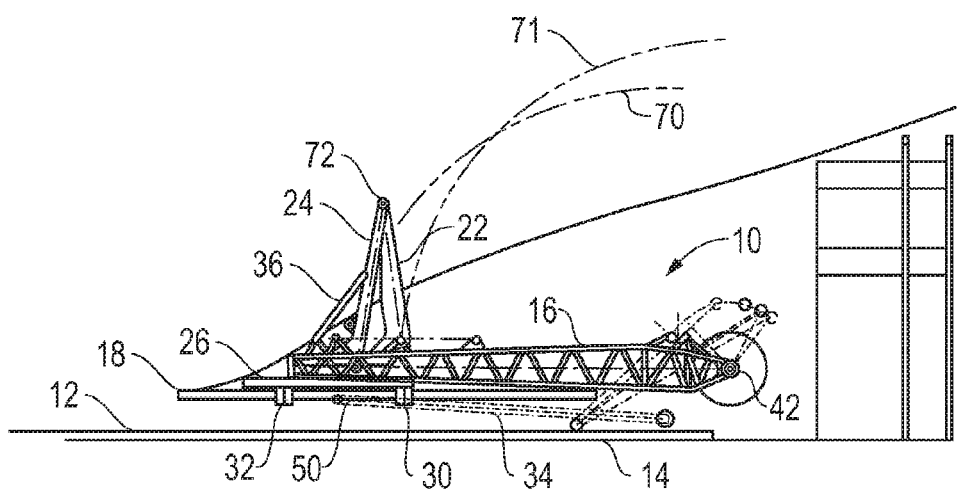
FIG. 2 is a side elevational view showing the pipe handling apparatus in a first position.

FIG. 2 illustrates the drill pipe 18 in a generally horizontal orientation. In the present invention, it is important to note that the drill pipe can be delivered to the apparatus 10 in a position below the main rotating structural member 16. In particular, the drill pipe can be loaded upon the skid 12 in a location generally adjacent to the grippers 30 and 32 associated with the gripper means 26. As such, the present invention facilitates the easy delivery of the drill pipe to the desired location. The gripper 30 and 32 will grip the outer diameter of the pipe 18 in this horizontal orientation.

In FIG. 2, it can be seen that the main rotating structural member 16 resides above the drill pipe 18 and in generally parallel relationship to the top surface of the skid 12. The lever assembly 22 is suitably pivoted so that the arm 24 extends through the interior of the framework of the main rotating structural member 16 and such that the gripper means 26 engages the pipe 18. The brace 36 resides in connection with the small framework of the main rotating structural member 16 and also is pivotally connected to the arm 24. The link 34 will reside below the main rotating structural member 16 generally adjacent to the upper surface of the skid 12 and is connected to the second portion 50 of the lever assembly 22 below the main rotating structural member 16.

Figure 3:
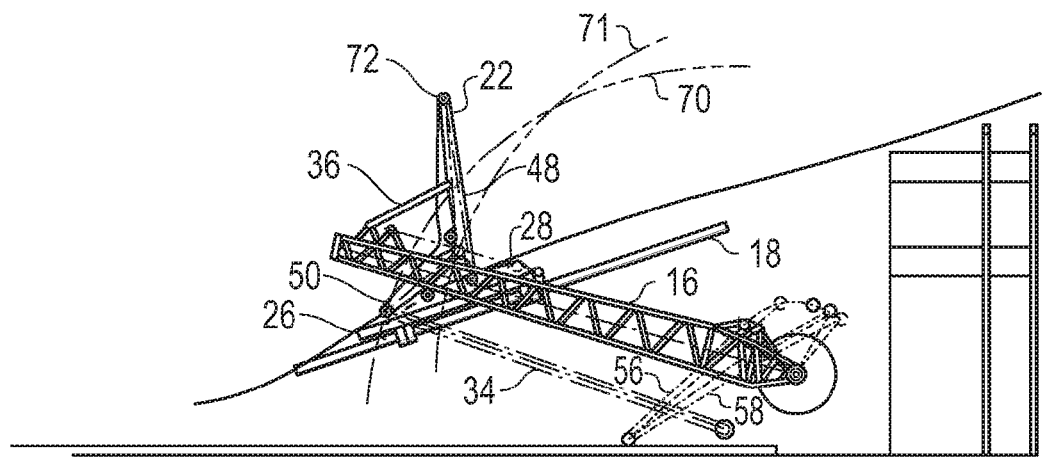
FIG. 3 is a side elevational view showing the pipe handling apparatus moving from the first position toward the second position.

Referring to FIG. 3, there is shown the preferred embodiment of the tubular handling apparatus 10 in accordance with the system of the present invention. The tubular handling apparatus 10 is mounted on a skid 12 that is supported upon the bed 14 of a vehicle, such as a truck. The tubular handling apparatus 10 in particular includes a main rotating structural member 16 that is pivotally movable between a first position and a second position. In FIG. 1, an intermediate position of the tubular handling apparatus 10 is particularly shown. In this position, the pipe 18 is illustrated in its position prior to installation on the drill rig 20. A lever assembly 22 is pivotally connected to the main rotating structural member 16. An arm 24 is pivotally connected to an end of the lever assembly 22 opposite the main rotating structural member 16. A gripper means 26 is fixedly connected to an opposite end of the arm 24 opposite the lever assembly 22. The gripper means 26 includes a body 28 and grippers 30 and 32. A link 34 has one end pivotally connected to the skid 12 and an opposite end pivotally connected to the end of the lever assembly 22 opposite the arm 24. A brace 36 is pivotally connected to the main rotating structural member 16 and also pivotally connected to the arm 24 between the lever assembly 22 and the body 28 of gripper means 26.

Figure 4:
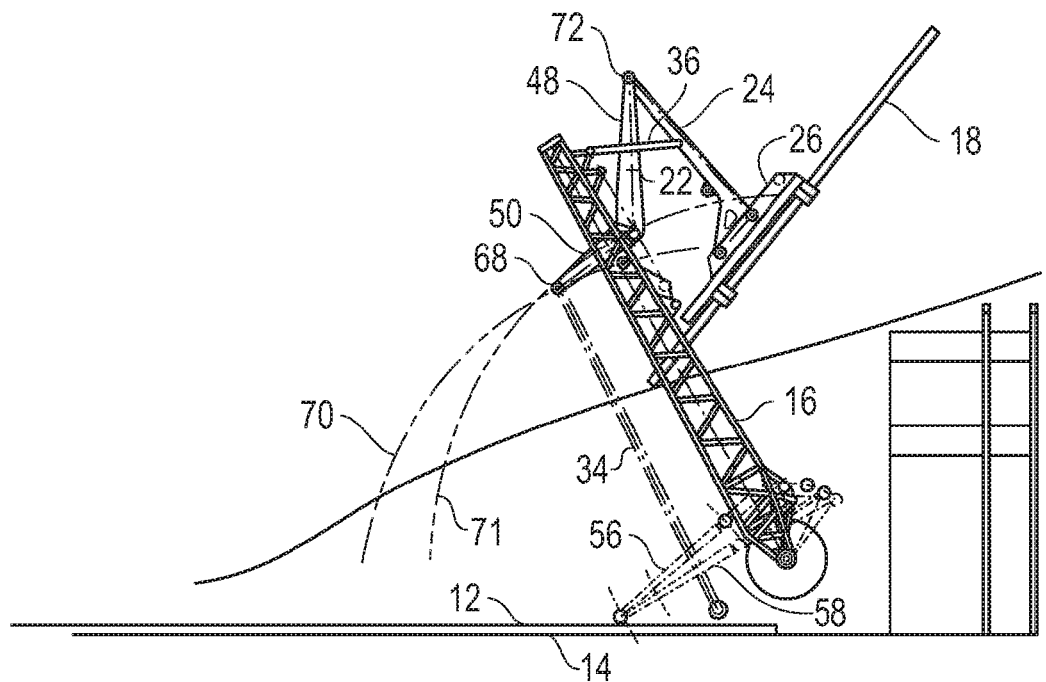
FIG. 4 is a side elevation view of the pipe handling apparatus showing the pipe handling apparatus as moving the pipe further to the second position.

FIG. 4 shows a further intermediate movement of the drill pipe 18. Once again, the hydraulic actuators 56 and 58 urge the main rotating structural member 16 angularly upwardly away from the top surface of the skid 12. This causes the link 34 to have a pulling force on the pivotal connection 68 of the second portion 50 of the lever assembly 22. This causes the first portion 48 of the lever assembly 22 to move upwardly thereby causing the arm 24, in combination with the brace 36 to lift the gripper means 26 further upwardly and draw the pipe 18 completely through the interior of the main rotating structural member 16. As can be seen, the relative size and relation of the various components of the present invention achieve the movement of the pipe 18 without the need for separate hydraulic actuators.

Figure 5:
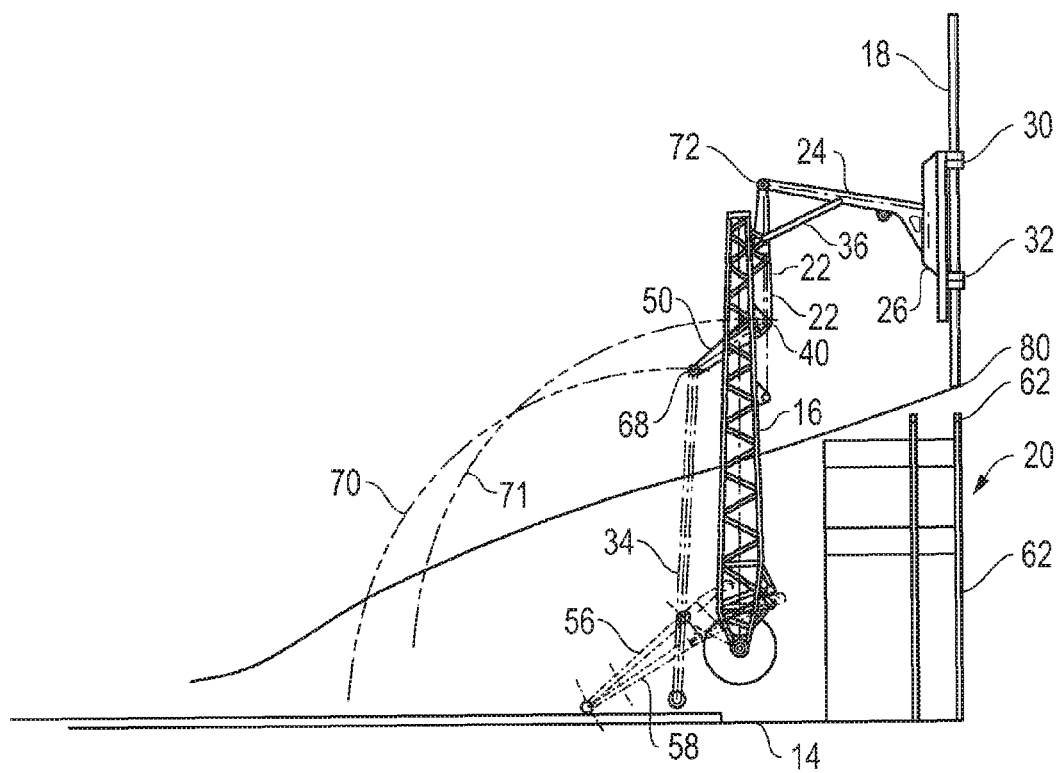
FIG. 5 is a side elevational view showing the pipe handling apparatus in its second position in which the pipe extends in a vertical orientation.

FIG. 5 illustrates the drill pipe 18 in its vertical orientation. As can be seen, the drill pipe 18 is positioned directly above the underlying pipe 62 on the drilling rig 20. The further upward pivotal movement of the main rotating structural member 16 is caused by the hydraulic cylinders 56 and 58. This causes the link 34 to rotate and draw the end of the second portion 50 of the lever assembly 22 downwardly. The lever assembly 22 rotates about the pivot point 40 such that the first portion 48 of the lever assembly 22 has a pivot 72 at its upper end. The brace 36 is now rotated in a position so as to provide support for the arm 24 in this upper position. The gripper means 26 has grippers 30 and 32 aligned vertically and in spaced parallel relationship to each other. If any further precise movement is required between the bottom end 80 of the pipe 18 and the upper end 82 of pipe 62, then the vehicle 14 can be moved slightly so as to achieve further precise movement. In the manner described hereinbefore, the drill pipe 18 has achieved a completely vertical orientation by virtue of the interrelationship of the various components of the present invention and without the need for complex control mechanisms and hydraulics.

In order to install the drill pipe 18 upon the pipe 62, it is only necessary to vertically translate the grippers 30 and 32 within the body 28 of the gripper means 26. As such, the end 80 can be stabbed into the box connection 82 of pipe 62. Suitable tongs, spinners, or other mechanisms can be utilized so as to rotate the pipe 18 in order to achieve a desired connection. The grippers 30 and 32 can then be released from the exterior of the pipe 18 and returned back to the original position such that another length of drill pipe can be installed.

Figure 6:
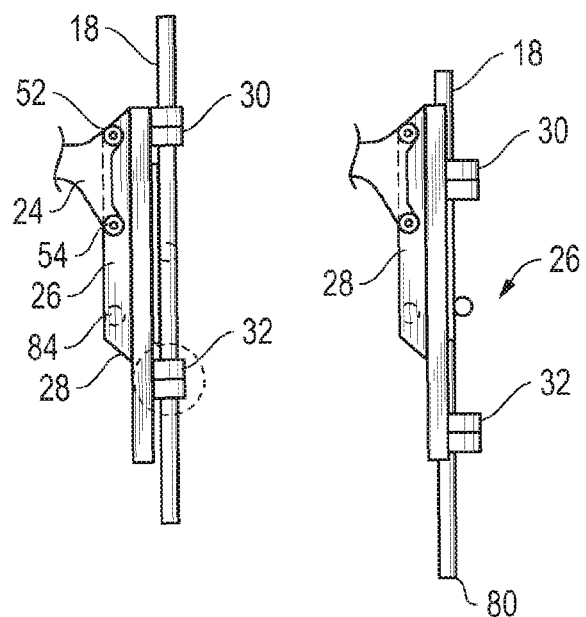
FIG. 6 shows a side elevational view of the grippers of the present invention.

FIG. 6 is a detailed view of the gripper means 26 of the present invention. In FIG. 6 the pin connections 52 and 54 have been installed into alternative holes formed on the body 28 of the gripper means 26. The holes, such as hole 84 can be formed in a surface of the body 28 so as to allow selective connection between the end of the arm 24 and the body 28 of gripper means 26. As such, the position of the gripper means 26 in relation to the arm 24 can be adapted to various circumstances.

It can be seen that the pipe 18 is engaged by grippers 30 and 32 of the gripper means 26. The configuration of the grippers 30 and 32, as shown in FIG. 6, is particularly designed for short length (approximately 30 feet) of drill pipe. In FIG. 6, it can be seen that the grippers 30 and 32 aretranslated relative to the body 28 so as to lower end 80 of pipe 18 downwardly for connection to an underlying pipe.

Figure 7:
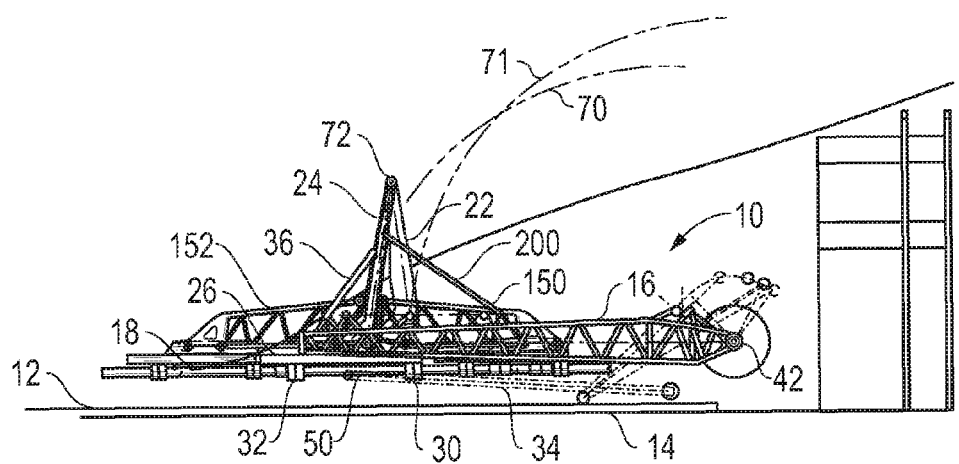
FIG. 7 shows a side elevational view of the preferred embodiment of the pipe handling apparatus of the present invention in the first position, with the guy wire attached to the stab frame and arm.

Referring to FIG. 7, there is shown a side elevational view of the pipe handling apparatus 10 of the present invention, with the guy wire 200 attached to the arm 24 and to the first stab frame 150 of the gripper means 26. The guy wire 200 has a constant tension in the first position.

Figure 8:
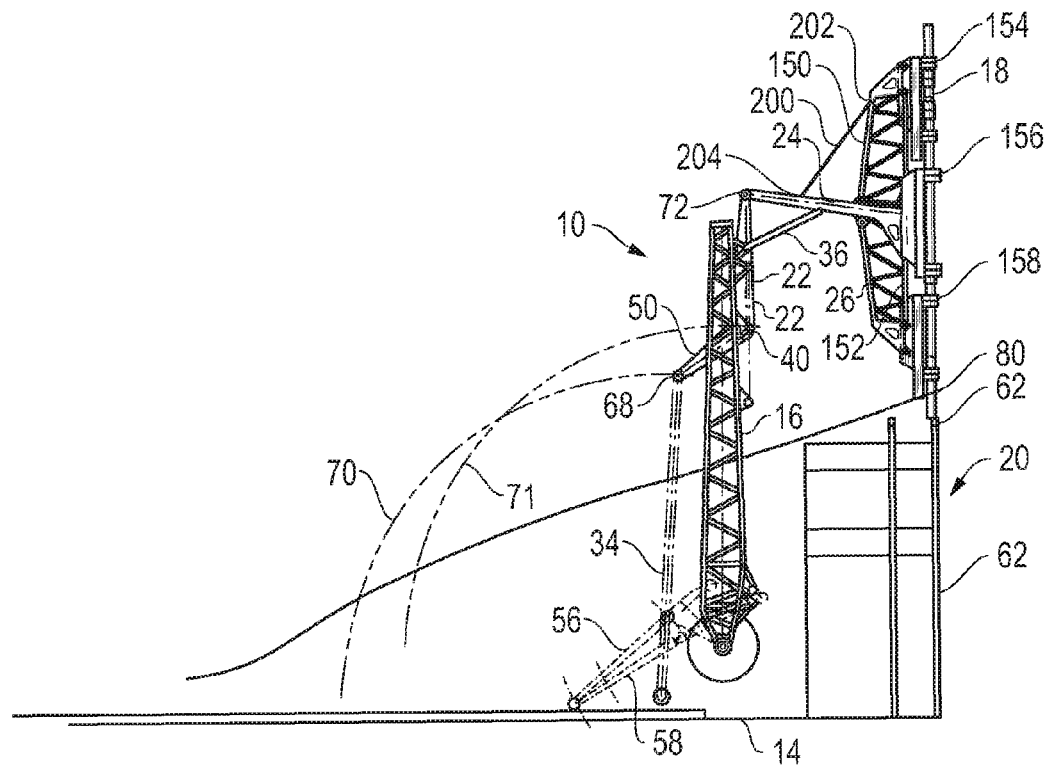
FIG. 8 shows a side elevational view of the preferred embodiment of the pipe handling apparatus of the present invention in the second position, with the guy wire attached to the stab frame and arm.

Referring to FIG. 8, there is shown a side elevational view of the pipe handling apparatus 10 of the present invention in the second position, with the guy wire 200 connected to the stab frame 150 and the arm 24. The end 202 of the guy wire 200 is connected to the first stab frame 150. The opposite end 204 of the guy wire 200 is connected to the arm 24. The guy wire 200 has a constant tension when the pipe handling apparatus 10 is in the second position. Moreover, the guy wire 200 has a constant tension as the main rotating structural member 16 moves between the first and second positions. The guy wire 200 can be made of a metallic material so that is suitable for withstanding stresses created by the weight of pipe 18 that has held in the gripper assemblies 154, 156, and 158. The guy wire 200 adds strength to the connection between the first stab frame 150 and the arm 24. It can be seen in FIG. 11 that the pipe 18 is exactly vertical with the wellhead 62. Without the guy wire 200, the pipe 18 would have a slightly less than vertical orientation because the weight of the pipe 18 would cause the connection between the stab frame 150 and 152 and the arm 24, the stab frame 150 and 152 itself, or the arm 24 itself to bend under the weight of the extremely long pipe 18.

Figure 9:
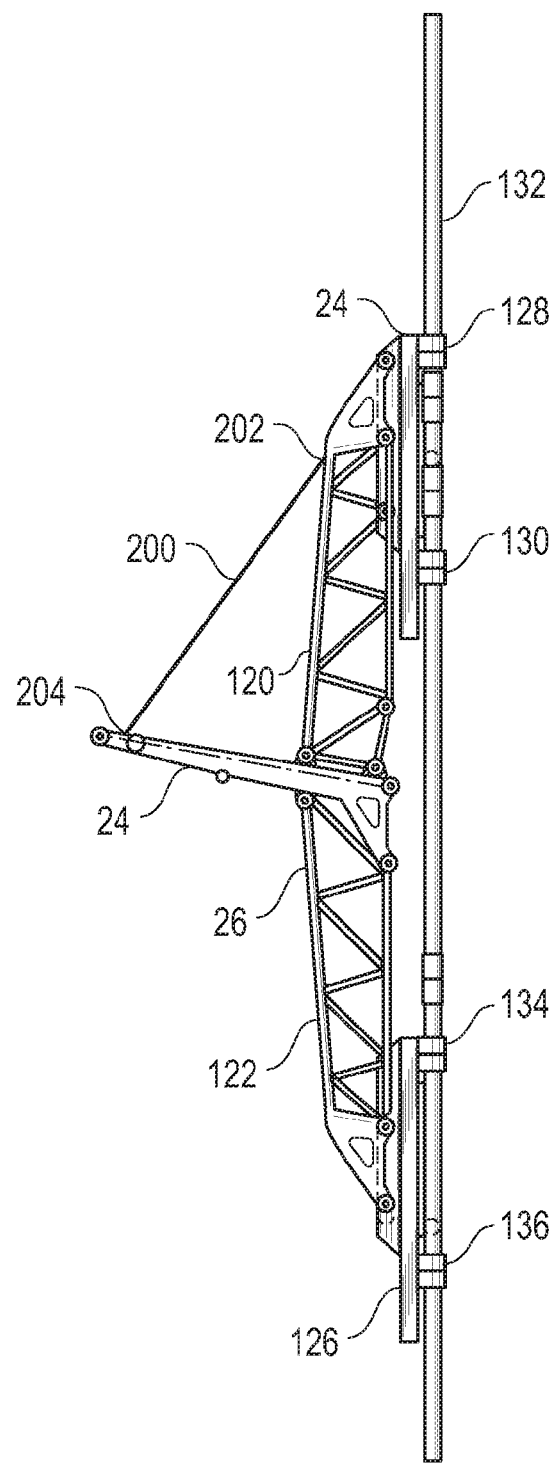
FIG. 9 shows an isolated side elevational view of the preferred embodiment, with the guy wire attached to the stab frame and the arm.

Referring to FIG. 9, there is shown an isolated side elevational view of the guy wire 200 attached to the first stab frame 120 and the arm 24. The end 202 of the guy wire 200 is connected to the first stab frame 120 near the top of the first stab frame 120. The opposite end 204 of the guy wire 200 is mounted adjacent the end of the arm 24 opposite stab frames 120 and 122.

Figure 10:
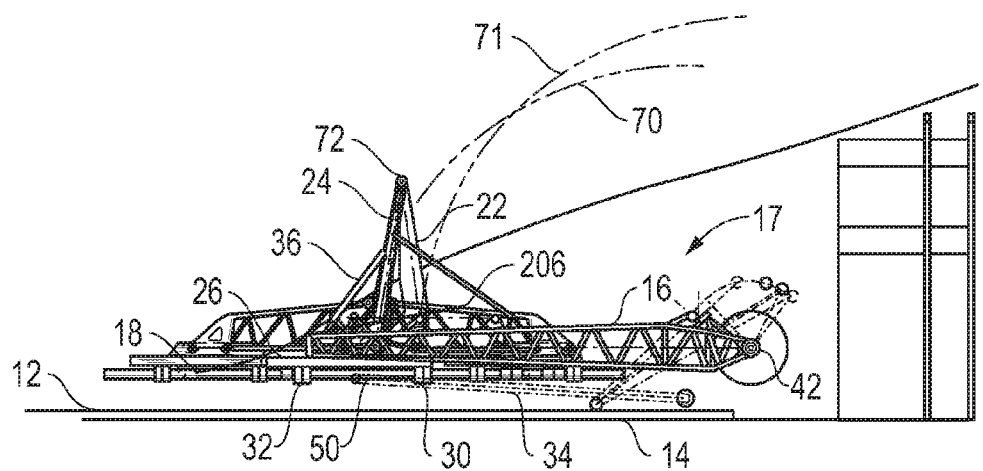
FIG. 10 shows a side elevational view of a first alternative embodiment of the pipe handling apparatus of the present invention in the first position, with the guy wire attached to the stab frame and to the main rotating structural member.

Referring to FIG. 10, there is shown a side elevational view of a first alternative embodiment of the pipe handling apparatus 17 of the present invention in the first position, with the guy wire 206 attached to the main rotating structural member 16 and to the gripper means 26. In the first position, the guy wire 206 is under a maximum tension. As the pipe handling apparatus 10 moves between the first position and the second position, the guy wire 206 loses maximum tension between the first and second positions and again gains maximum tension when the pipe handling apparatus 10 reaches the second position.

Figure 11:
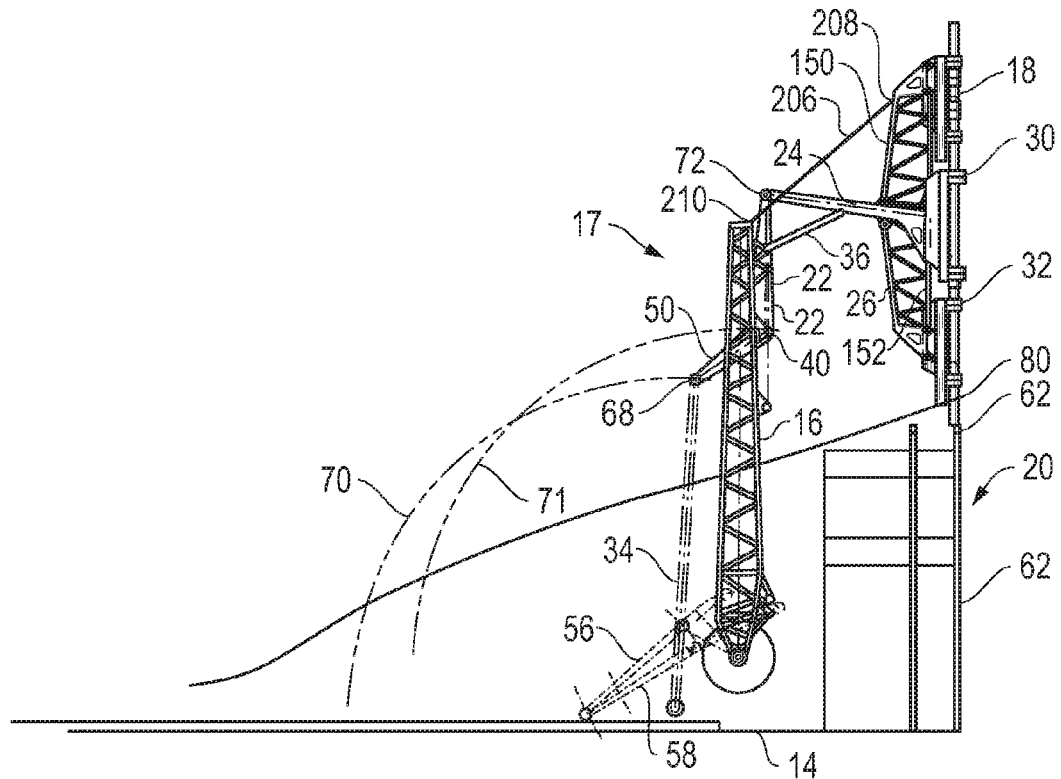
FIG. 11 shows a side elevational view of the first alternative embodiment pipe handling apparatus of the present invention in the second position, with the guy wire attached to the stab frame and to the main rotating structural member.

Referring to FIG. 11, there is shown a side elevational view of the first alternative embodiment of the pipe handling apparatus 17 in the second position, with the guy wire 206 connected to the first stab frame 150 of the gripper means 26 and to the boom 16. Particularly, the end 208 of the guy wire 206 is attached to the first stab frame 150. The opposite end 210 of the guy wire 206 is attached the main rotating structural member 16. The end 208 of the guy wire 206 is attached adjacent the top of the first stab frame 150. The opposite end 210 of the guy wire 206 is attached adjacent the top of the main rotating structural member 16. As can be seen, the guy wire 206 is under maximum tension so as to provide a stiffening of the arm 24, the stab frame 150 and 152, and the connection between the arm 24 and the stab frame 150 and 152.

Figure 12:
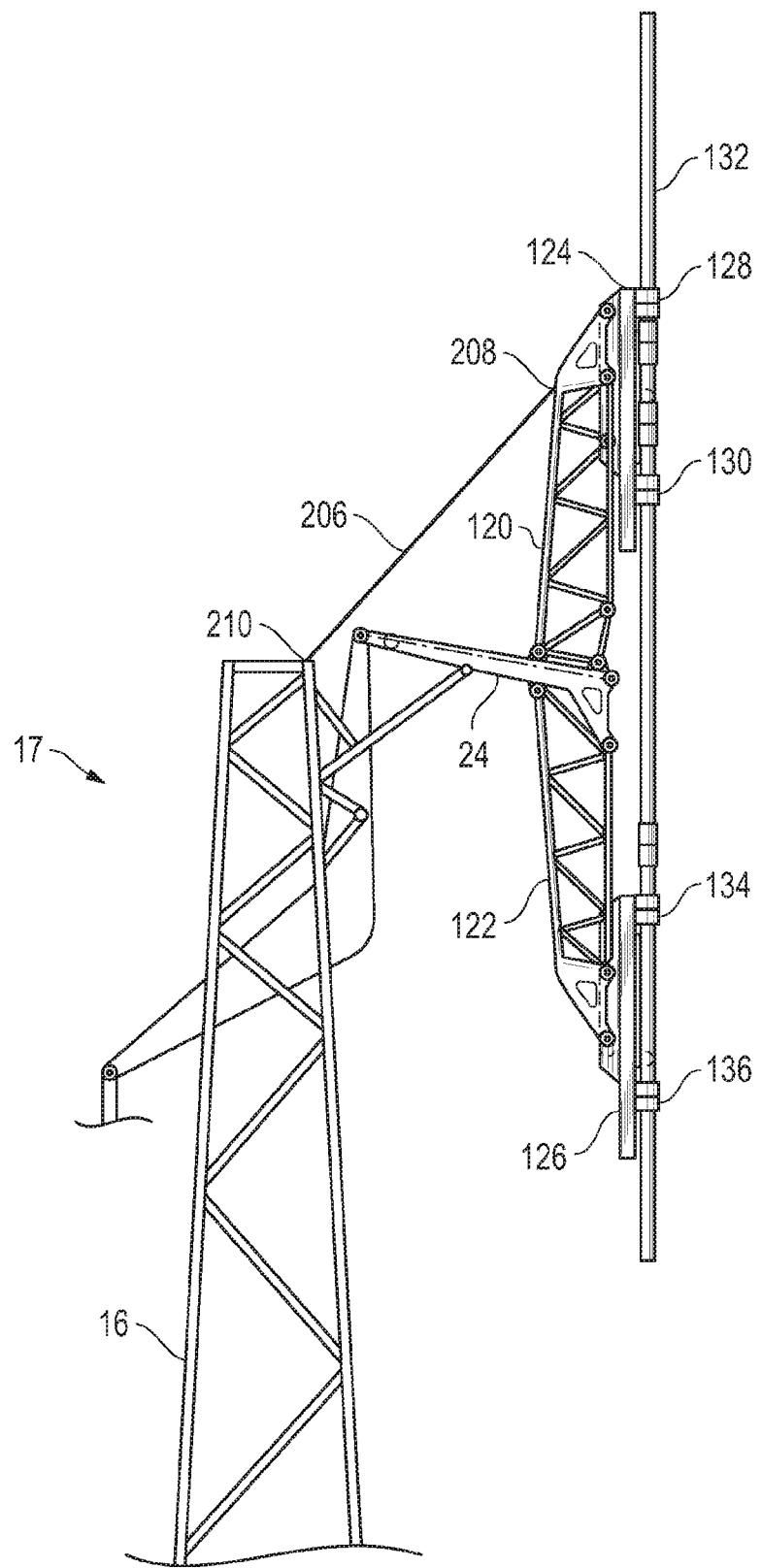
FIG. 12 shows an isolated side elevational view of the first alternative embodiment of the guy wire attached to the stab frame and to the main rotating structural member.

Referring to FIG. 12, there is shown an isolated side-elevational view of first alternative embodiment with the guy wire 206 attached to the stab frame 120 and 122 and the main rotating structural member 16. The guy wire 206 is attached so that it is at a maximum tension when the pipe handling apparatus 17 is in the second position. The end 210 of the guy wire 206 is attached to the main rotating structural member 16 near a top thereof. The ends 208 of the guy wire 206 is attached near a top of the first stab frame 120. The exact location of the ends 208 and 210 of the guy wire 206 can be changed for different configurations of the pipe handling apparatus 17 as long as the guy wire 206 has a maximum tension when the pipe handling apparatus 17 is in the first and second positions.

The present invention contemplates that the pipe handling apparatus can have multiple arms 24 so as to increase the structural strength of the pipe handling apparatus of the present invention when using long lengths of pipe.

Figure 13:
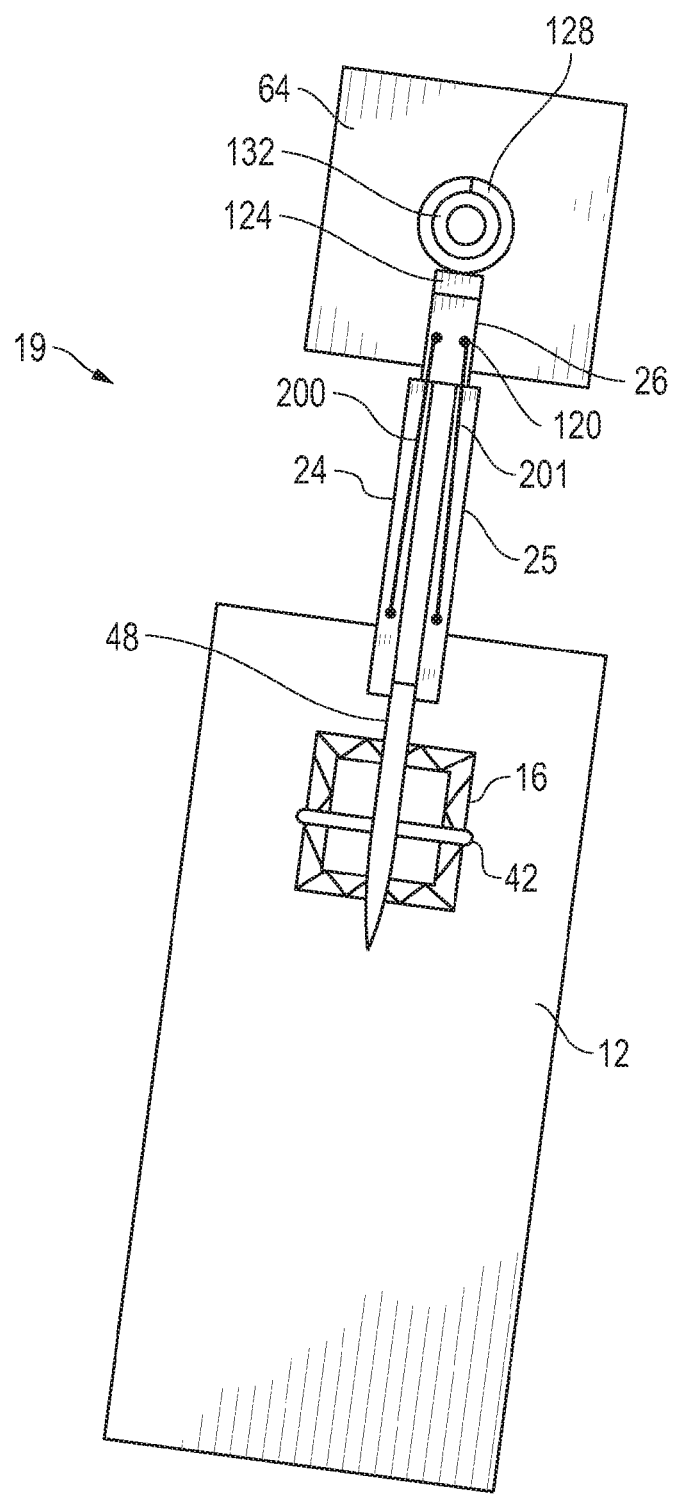
FIG. 13 shows a plan view of a second alternative embodiment of the apparatus having two arms and two guy wires, where the guy wires are attached to the stab frame and to the arms.

Referring to FIG. 13, there is shown a top view of a second alternative embodiment of the apparatus 19 of the present invention. The apparatus 19 has two arms 24 and 25. Each arm 24 and 25 is connected to the lever assembly 48. Each arm 24 and 25 is also connected to the stab frame 120 of the gripper means 26. The apparatus 19 is shown in the second position, as the pipe 132 is in the vertical orientation over the drill floor 64. Gripper 128 can be seen as gripping the surface of the pipe 132. The use of two arms 24 and 25 instead of only one arm increases the strength of the pipe handling apparatus 19 so that larger and longer pipe 132 can be delivered to and from the well floor 64. Guy wire 200 has an end connected to the stab frame 120 of the gripper means 26. Guy wire 200 has an opposite end connected to the arm 24. The tension of the guy wire 200 remains at maximum tension during all movements of the apparatus 19. Guy wire 201 has an end connected to the stab frame 120 of the gripper means 26. Guy wire 201 has an opposite end connected to the arm 25. The tension of the guy wire 201 remains at maximum tension during all movements of the apparatus 19. By having guy wires 200 and 201 at maximum tension, the stiffness of the connection between the arms 24 and 25 and the gripper means 26 is increased. The second alternative embodiment contemplates that only guy wire 200 is extended between one of the arms 24 and 25 and the stab frame 120 of the gripper means 26.

Figure 14:
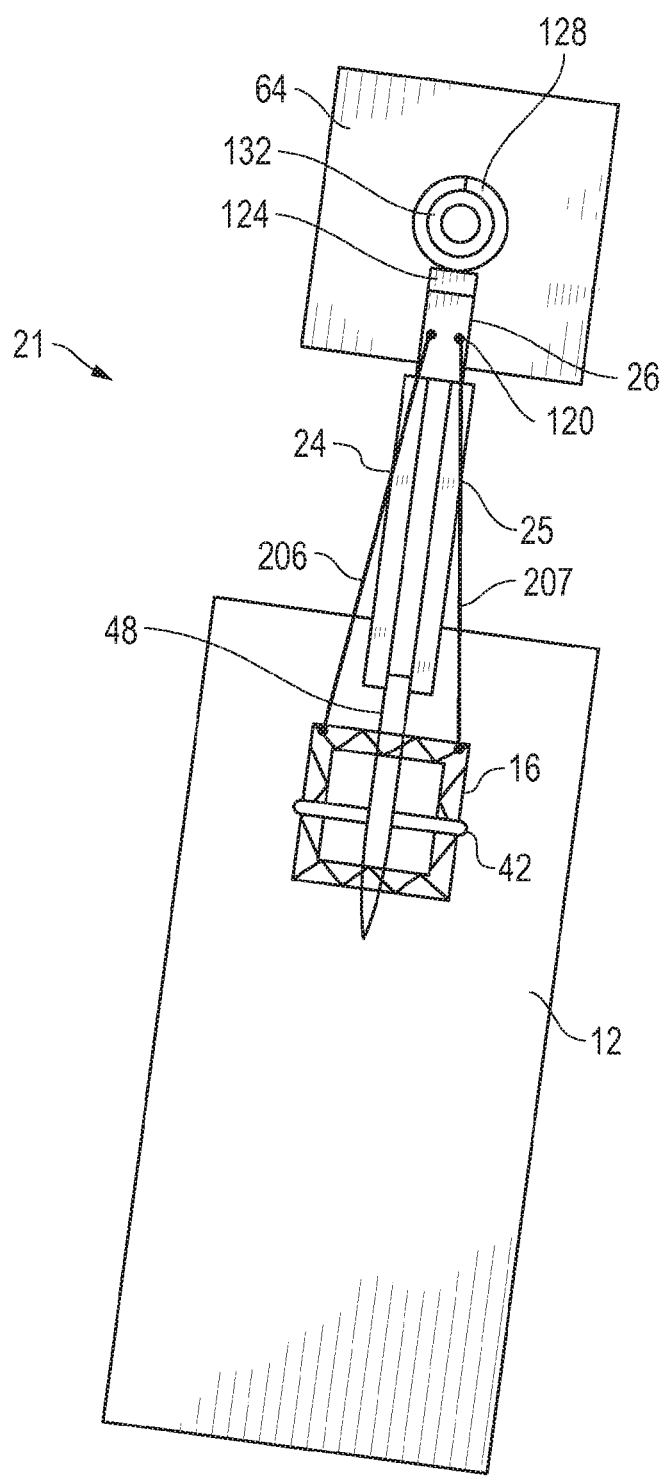
FIG. 14 shows a plan view of a third alternative embodiment of the apparatus having two arms and two guy wires, where the guy wires are attached to the stab frame and to the main rotating structural member.

Referring to FIG. 14, there is shown a top view of a third alternative embodiment of the apparatus 21 of the present invention. The apparatus 21 has two arms 24 and 25. Each arm 24 and 25 is connected to the lever assembly 48. Each arm 24 and 25 is also connected to the stab frame 120 of the gripper means 26. The apparatus 21 is shown in the second position, as the pipe 132 is in the vertical orientation over the drill floor 64. Gripper 128 can be seen as gripping the surface of the pipe 132. The use of two arms 24 and 25 instead of only one arm increases the strength of the pipe handling apparatus 21 so that larger and longer pipe 132 can be delivered to and from the well floor 64. Guy wire 206 has an end connected to the stab frame 120 of the gripper means 26. Guy wire 206 has an opposite end connected to the main rotating structural member 16. The tension of the guy wire 206 is at maximum tension when the apparatus 21 is in the first and second positions. Guy wire 206 is not necessarily at maximum tension when the apparatus 21 is not in the first or second position. Guy wire 207 has an end connected to the stab frame 120 of the gripper means 26. Guy wire 207 has an opposite end connected to the main rotating structural member 16. The tension of the guy wire 207 is at maximum tension when the apparatus 21 is in the first and second positions. Guy wire 207 is not necessarily at maximum tension when the apparatus 21 is not in the first or second position. By having guy wires 206 and 207 at maximum tension in the first and second positions, the stiffness of the connection between the arms 24 and 25 and the gripper means 26 is increased. The third alternative embodiment contemplates that only guy wires 206 and 207 are extended between the main rotating structural member 16 and the stab frame 120 of the gripper means 26.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A pipe handling apparatus for moving a pipe from a stowed position to a position deployed above a wellhead, the apparatus comprising:
   a base;
   a main rotating structural member pivotally mounted to the base and pivotally movable about a first pivot point between a first position and a second position;
   a lever assembly pivotally connected to the structural member, and having a first portion extending beyond a wellhead side of the main rotating structure, and a second portion extending beyond an opposite non-wellhead side of the main rotating structure;
   a link connected to the second portion of the lever assembly and extending to a second pivot point at the base such that the first pivot point is located in offset relationship to and above the second pivot point;
   an arm pivotally connected on one end to the first portion of the lever assembly, the arm being pivotable between a retracted position and an extended position;
   a gripper assembly affixed to an opposite end of the arm, the gripper assembly configured for gripping a surface of a pipe;
   a tensioning member connected at one end thereof to the gripper assembly for applying a tension to the gripper assembly; and
   wherein the gripper assembly passes through the main rotating structural member as the main rotating structural member moves between the first and second positions.

2. The pipe handling apparatus of claim 1, wherein the tensioning member has an opposite end connected to the arm.

3. The pipe handling apparatus of claim 2, the tensioning member having a constant tension as the main structural member moves between the first and second positions.

4. The pipe handling apparatus of claim 1, the tensioning member connected at an opposite end to the main rotating structural member.

5. The pipe handling apparatus of claim 1, the tensioning member comprising a guy wire, the guy wire having a minimum tension when the main rotating structural member is in the first position and a maximum tension when the main rotating structural member is in the second position.

6. The pipe handling apparatus of claim 4, the tensioning member comprising a first guy wire affixed at one end to the main rotating structural member and an opposite end affixed to the gripper assembly, and a second guy wire affixed at one end to the main rotating structural member and an opposite end affixed to the gripper assembly, the first and second guy wires converging toward the gripper assembly.

7. The pipe handling apparatus of claim 1, the gripper assembly comprising:
- a stab frame affixed to an end of the arm opposite the lever;
- a first gripper extending outwardly from a side of the stab frame opposite the arm; and
- a second gripper extending outwardly from the side of the stab frame opposite the arm in spaced relation to the first gripper.

8. The pipe handling apparatus of claim 7, the tensioning member being connected to the stab frame.

9. The pipe handling apparatus of claim 8, the tensioning member comprising at least one guy wire connected at one end to the stab frame and an opposite end connected to the arm.

10. The pipe handling apparatus of claim 8, the tensioning member comprising at least one guy wire connected at one end to the stab frame and an opposite end connected to the main rotating structural member.

11. The pipe handling apparatus of claim 7, the stab frame comprising:
- a first stab frame; and
- a second stab frame positioned below the first stab frame, the tensioning member being connected to the first stab frame.

12. The pipe handling apparatus of claim 1, further comprising:
- a brace having an end pivotally connected to the main rotating structural member and an opposite end pivotally connected to the arm at a point between the ends of the arm.

13. A gripper assembly for a pipe handling apparatus comprising:
- an arm, the arm being movable between a retracted position and an extended position;
- a stab frame connected to an end of the arm;
- an upper gripper connected to the stab frame and extending outwardly therefrom, and a lower gripper connected to the stab frame and extending outwardly therefrom, the upper and lower grippers suitable for gripping a surface of a pipe;
- a lever assembly pivotally connected to the arm; and
- a tensioning member connected at one end to the stab frame and at an opposite end to the arm for applying a tension force to the stab frame when the arm is in the extended position.

14. A gripper assembly for a pipe handling apparatus comprising:
- an arm, the arm being movable between a retracted position and an extended position;
- a stab frame connected to an end of the arm;
- an upper gripper connected to the stab frame and extending outwardly therefrom, and a lower gripper connected to the stab frame and extending outwardly therefrom, the upper and lower grippers suitable for gripping a surface of a pipe;
- a lever assembly pivotally connected to the arm;
- a main rotating structural member pivotally connected to the lever assembly, the lever assembly having a first portion extending beyond a wellhead side of the main structural member, and a second portion extending beyond an opposite non-wellhead side of the main structural member; and
- a tensioning member having one end connected to the stab frame and an opposite end connected to the main structural member.

15. The gripper assembly of claim 14, the main structural member being pivotal between a first position and a second position, the tensioning member applying a maximum tension to the stab frame when the main structural member is in the second position.

16. The gripper assembly of claim 15, the tensioning member comprising a guy wire having an end connected adjacent an end of the main structural member and an opposite end connected to the stab frame, the guy wire extending angularly upwardly from the main structural member in the second position.

17. The gripper assembly of claim 16, the tensioning member comprising a first guy wire affixed at one end to the main rotating structural member and an opposite end affixed to the gripper assembly and a second guy wire affixed at one end to the main structural member and an opposite end affixed to the gripper assembly, the first and second guy wires converging toward the gripper assembly.

* * * * *